(12) United States Patent
Murakami et al.

(10) Patent No.: US 7,837,231 B2
(45) Date of Patent: Nov. 23, 2010

(54) SEAT BELT APPARATUS AND SEAT BELT RETRACTOR

(75) Inventors: Daisuke Murakami, Tokyo (JP); Koji Inuzuka, Tokyo (JP); Koji Tanaka, Tokyo (JP); Masato Takao, Tokyo (JP)

(73) Assignee: Takata Corporation, Tokyo (JP)

( * ) Notice: Subject to any disclaimer, the term of this patent is extended or adjusted under 35 U.S.C. 154(b) by 287 days.

(21) Appl. No.: 12/216,028

(22) Filed: Jun. 27, 2008

(65) Prior Publication Data

US 2009/0051157 A1    Feb. 26, 2009

(30) Foreign Application Priority Data

Aug. 23, 2007    (JP)    ............... 2007-217302

(51) Int. Cl.
  B60R 22/46    (2006.01)
  B60R 22/08    (2006.01)
(52) U.S. Cl. ........................ 280/803; 280/807
(58) Field of Classification Search ................ 280/804, 280/807, 803; 180/282; 242/374
  See application file for complete search history.

(56) References Cited

U.S. PATENT DOCUMENTS

| | | | |
|---|---|---|---|
| 5,765,774 A | 6/1998 | Maekawa et al. | |
| 6,343,759 B1 * | 2/2002 | Specht | 242/375.1 |
| 6,447,012 B2 | 9/2002 | Peter et al. | |
| 6,494,395 B1 * | 12/2002 | Fujii et al. | 242/374 |
| 6,550,810 B1 * | 4/2003 | Bauer et al. | 280/803 |
| 6,575,394 B1 * | 6/2003 | Fujita et al. | 242/390.8 |
| 6,702,326 B1 * | 3/2004 | Fujii | 280/806 |
| 6,827,308 B2 * | 12/2004 | Fujii et al. | 242/390.9 |
| 6,935,590 B2 * | 8/2005 | Karwaczynski | 242/390.8 |
| 2007/0114775 A1 | 5/2007 | Inuzuka et al. | |
| 2008/0105777 A1 | 5/2008 | Holbein et al. | |

FOREIGN PATENT DOCUMENTS

| | | |
|---|---|---|
| JP | 8-40204 | 2/1996 |
| JP | 9-272401 | 10/1997 |
| JP | 2000-135969 | 5/2000 |
| JP | 2001-130377 | 5/2001 |
| JP | 2001-187561 | 7/2001 |
| JP | 2001-199309 | 7/2001 |
| JP | 2007-145079 | 6/2007 |

* cited by examiner

*Primary Examiner*—Paul N Dickson
*Assistant Examiner*—Timothy D Wilhelm
(74) *Attorney, Agent, or Firm*—Foley & Lardner LLP (57) ABSTRACT

A seat belt retractor includes a frame having a back plate and a side wall protruding from each of a plurality of side edges of the back plate. The seat belt retractor also includes a spool supported by the frame and rotating to wind a seat belt, a motor for rotating the spool, and an electronic control unit for controlling the drive to the motor. The electronic control unit is attached to a surface of the frame in a direction of a vehicle interior.

6 Claims, 6 Drawing Sheets

SEAT BELT APPARATUS AND SEAT BELT RETRACTOR

BACKGROUND

The present disclosure relates to a seat belt apparatus and a seat belt retractor that retracts and/or withdraws a seat belt by rotating a spool with an electric motor. The disclosure relates more particularly to a seat belt apparatus and a seat belt retractor where the electric motor is controlled by an electronic control unit (ECU).

A conventional seat belt apparatus mounted in a motor vehicle (e.g., an automobile or the like) is configured restrain an occupant to a seat with a seat belt in an event such as a collision of a motor vehicle, rapid braking, etc. The seat belt apparatus includes a seat belt retractor for retracting and/or withdrawing the seat belt. The seat belt is wound on a spool of the retractor when the seat belt is not worn, the seat belt may be withdrawn from the retractor and worn by the occupant. During an event a locking mechanism of the seat belt retractor is activated and the rotation of the spool is prevented in a withdrawing direction so the seat belt cannot be withdrawn. Rotation of the spool may be carried out by an electric motor.

SUMMARY

One embodiment of the disclosure relates to a seat belt retractor including a frame and having a back plate and a side wall protruding from each of a plurality of side edges of the back plate. The seat belt retractor also includes a spool supported by the frame and rotating to wind a seat belt, a motor for rotating the spool, and an electronic control unit for controlling the drive to the motor. The electronic control unit is attached to a surface of the frame in a direction of a vehicle interior.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 5:
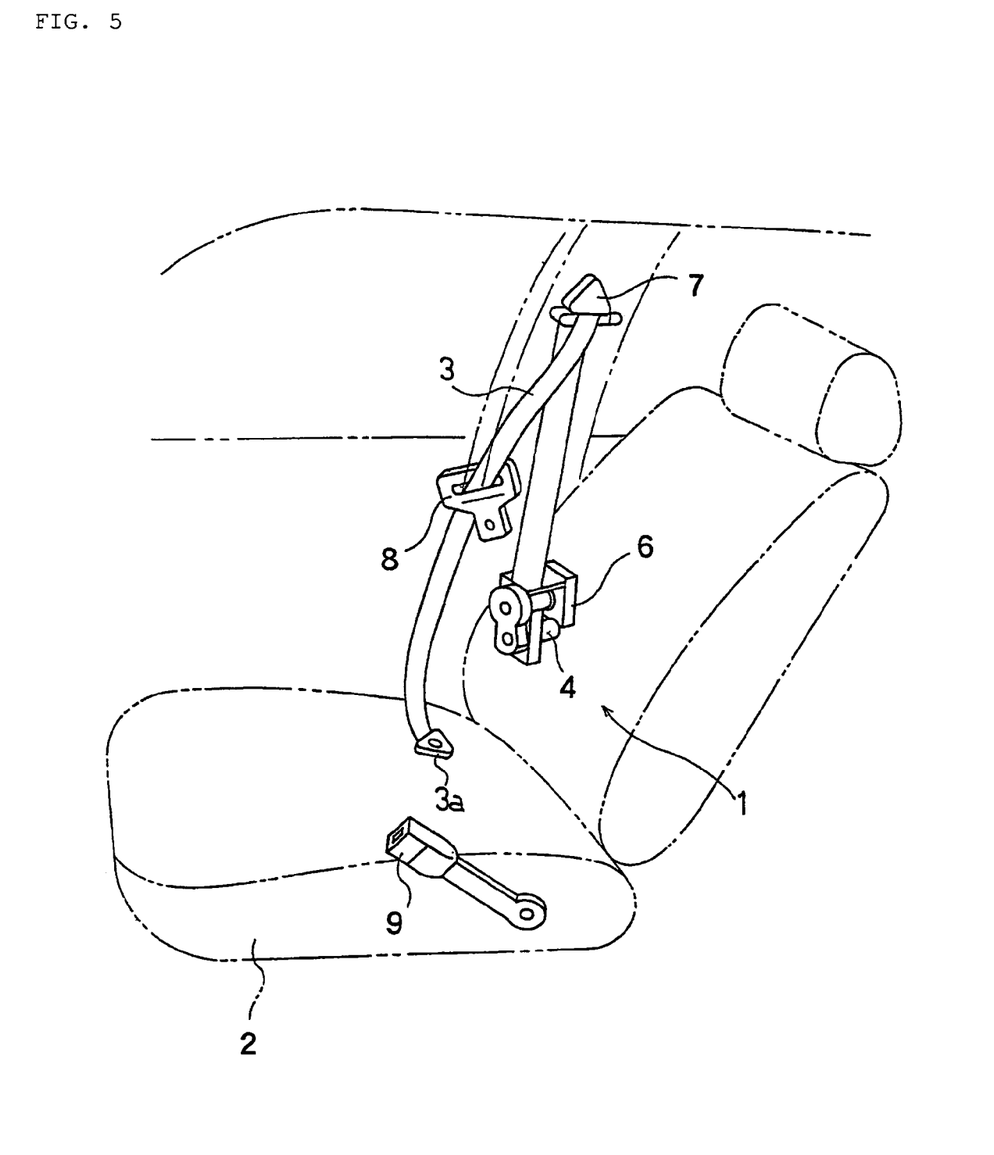
FIG. 5 is a schematic view illustrating a seat belt apparatus according to an exemplary embodiment.
Figure 6:
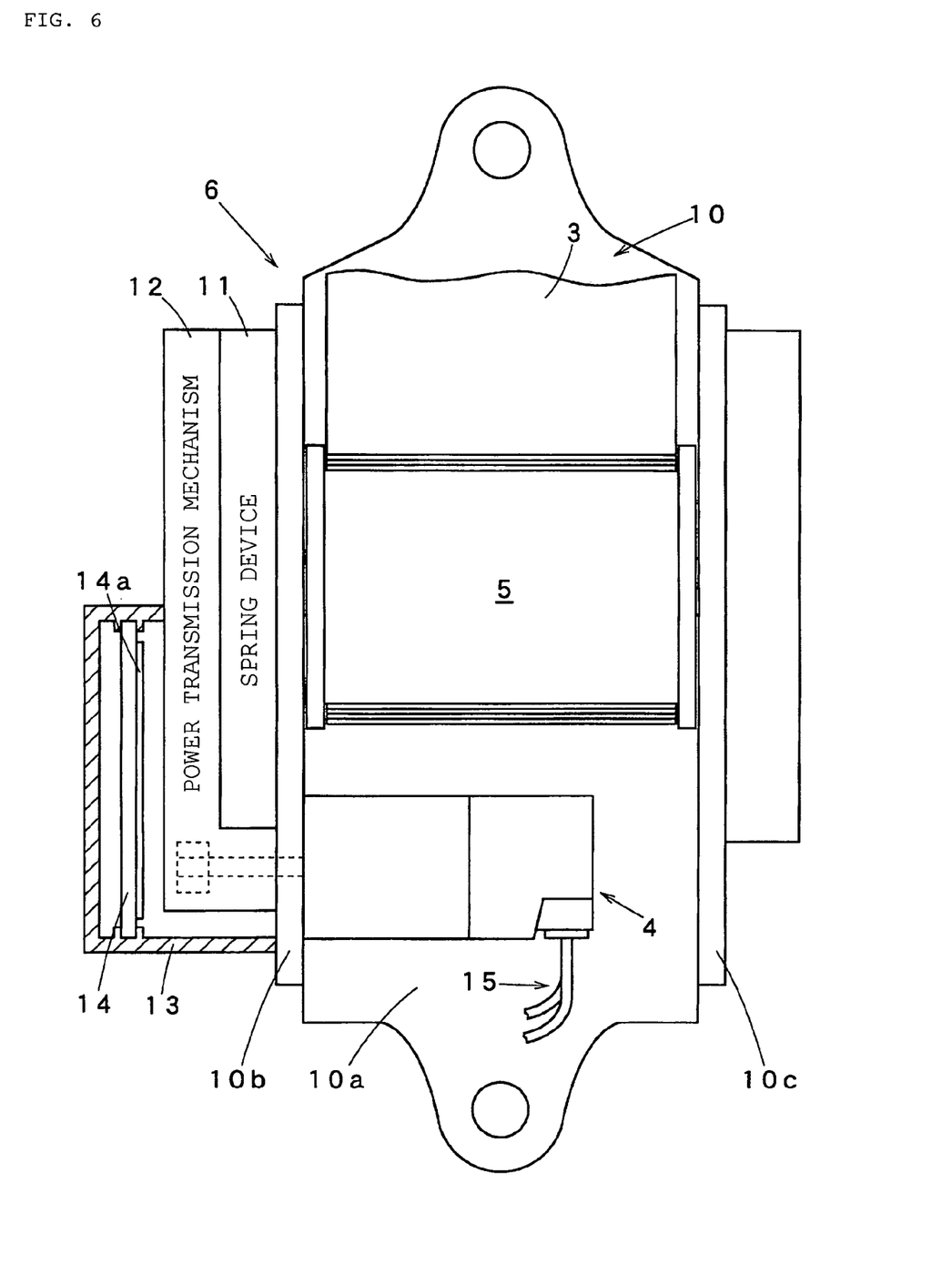
FIG. 6 is a schematic view illustrating a seat belt retractor used in the seat belt apparatus of FIG. 5 according to an exemplary embodiment.

Referring to FIG. 5, a schematic view illustrates a seat belt apparatus and FIG. 6 illustrates a seat belt retractor used in the seat belt apparatus of FIG. 5 according to various exemplary embodiments.

As illustrated in FIGS. 5 and 6, a seat belt apparatus 1 may be a three-point type seat belt apparatus and includes a seat belt 3, a belt anchor 3a, a seat belt retractor 6, a guide anchor 7, a tongue 8, and a buckle 9. The belt anchor 3a at a tip end of the seat belt 3 is fixed to a vehicle body floor or a vehicle seat 2. The seat belt retractor 6 is fixed to a vehicle body and retracts the seat belt 3 by rotating a spool 5 with an electric motor 4. The guide anchor 7 guides the seat belt 3 as it is withdrawn from the seat belt retractor 6 toward a shoulder of the occupant. The tongue 8 is slidably supported by the seat belt 3. The buckle 9 is fixed to the vehicle body floor or the vehicle seat 2 and the tongue 8 is inserted and engaged or removed and disengaged.

The seat belt retractor 6 includes a C-shaped frame 10 having a back plate 10a, a left side wall 10b, and a right side wall 10c. The left and right sidewalls 10b, 10c protrude from the left and right sides of the back plate 10a. The seat belt retractor 6 receives the seat belt 3 and the spool 5 is supported by the frame 10 and rotates to retract the seat belt 3. The seat belt retractor 6 includes a spring device 11 that is supported by the frame 10 and biases the spool 5 in a seat belt-retracting direction. The motor 4 drives or rotates the spool 5 and is supported by the frame 10. A power transmission mechanism 12 is supported by the frame 10, transmits power from the motor 4 to the spool 5, and converts the speed of the motor 4. A circuit board 14 is supported by a cover 13 on a side wall 10b at a left side of the frame 10 and includes a printed circuit 14a for driving and/or controlling the motor 4. The printed circuit 14a of the circuit board 14 is electrically connected to the motor 4 and a power source.

A vehicle sensor (e.g., a deceleration sensing mechanism) may be activated when a predetermined deceleration threshold is reached or surpassed by the motor vehicle (e.g., a collision, hard braking, etc.). A webbing sensor may be activated when the worn seat belt 3 is rapidly withdrawn at a speed higher than a typical withdrawal speed of the seat belt 3. A locking mechanism for locking the rotation of the spool 5 in a seat belt-withdrawing direction may be provided in the right side wall 10c of the frame 10 and may be activated by the activation of any one of the vehicle sensor or the webbing sensor.

Conventional seat belt retractors are generally disposed in a narrow space inside a vehicle, for example a space inside a center pillar or the like. A vehicle body may include an opening (e.g., in the center pillar, etc.) for installing or removing the seat belt retractor.

According to an exemplary embodiment, the circuit board 14 may be attached to the seat belt retractor 6 in such a way that the circuit board 14 may easily be removed, exchanged, or installed. The seat belt retractor 6 does not have to be detached from the limited narrow space inside the motor vehicle through the opening when only the circuit board 14 is to be serviced.

The circuit board 14 is secured on a portion of the frame 10 of the seat belt retractor 6. To increase the strength of the frame 10, the wall thickness of the frame 10 may be increased and the structural size of the frame 10 may be increased, increasing the size of the seat belt retractor 6. A large seat belt retractor 6 may be more difficult to in the limited narrow space inside the motor vehicle (e.g., the inner space of the center pillar, etc.).

According to an exemplary embodiment, a seat belt retractor may be more accessible making it easier to exchange an electronic control unit and assemble the seat belt retractor. The seat belt retractor and a seat belt apparatus may be compactly formed with an attached electronic control unit.

According to an exemplary embodiment, a seat belt retractor including a frame and having a back plate and a side wall protruding from each of a plurality of side edges of the back plate. The seat belt retractor also includes a spool supported by the frame and rotating to wind a seat belt, a motor for rotating the spool, and an electronic control unit for controlling the drive to the motor. The electronic control unit is attached to a surface of the frame in a direction of a vehicle interior.

According to an exemplary embodiment, a surface of the back plate facing away from the spool faces the direction of the vehicle interior and the electronic control unit is on the surface of the back plate facing away from the spool.

According to an exemplary embodiment, the electronic control unit is attached to a surface of the back plate facing the direction of the vehicle interior at a position facing multiple side walls of the frame.

According to an exemplary embodiment, an end surface of multiple side walls of the frame at a side of the frame opposite to the back plate faces the direction of the vehicle interior and the electronic control unit is installed on the end surface of multiple side walls.

According to an exemplary embodiment, a side surface of one side wall of the frame faces the direction of the vehicle interior and the electronic control unit is on the side surface of the one side wall.

According to an exemplary embodiment, a seat belt apparatus includes a seat belt retractor performing at least one of retracting and withdrawing operations for the seat belt by rotating the spool with the motor. The seat belt apparatus includes a tongue is slidably supported by the seat belt and withdrawn from the seat belt retractor. The seat belt apparatus includes a buckle for engaging and disengaging the tongue and restraining an occupant with the seat belt by engaging the tongue with the buckle.

According to an exemplary embodiment, since the electronic control unit is detachably attached to a surface of the frame facing a vehicle interior direction, the electronic control unit can be detached and exchanged for another electronic control unit without detaching an entire seat belt retractor, for example when the electronic control unit is not functioning properly or is broken down. Exchanging the electronic control unit may be easier even when the electronic control unit is attached to the seat belt retractor.

The electronic control unit can be used as a reinforcing member for the frame because the electronic control unit is attached to a surface of the back plate facing the vehicle interior at a position facing both side walls of the frame (as compared with when the electronic control unit is provided on the side walls). Thus the strength of the frame can be increased without increasing the wall thickness of the frame or complicating or enlarging the structural size of the frame. Even when the electronic control unit is attached to the seat belt retractor, the seat belt retractor can be formed to be lightweight and compact and assembling the seat belt retractor in a limited narrow space inside the motor vehicle (e.g., an inner space of the center pillar, etc.) may be easier.

Because the electronic control unit is attached to the back plate at a position facing both side walls of the frame, the electronic control unit functions as a counter weight and vibration of the seat belt retractor may be suppressed.

Because the seat belt retractor may be compact and able to be assembled in a narrow space such as the inner space of the center pillar or the like, an inner space of a vehicle interior of a motor vehicle may be less wastefully occupied by the seat belt retractor even when the seat belt retractor includes a motor and electronic control unit. The restraining capability for an occupant can be adjusted by a belt tension control for the seat belt with the motor while maintaining occupant comfort.

Figure 1:
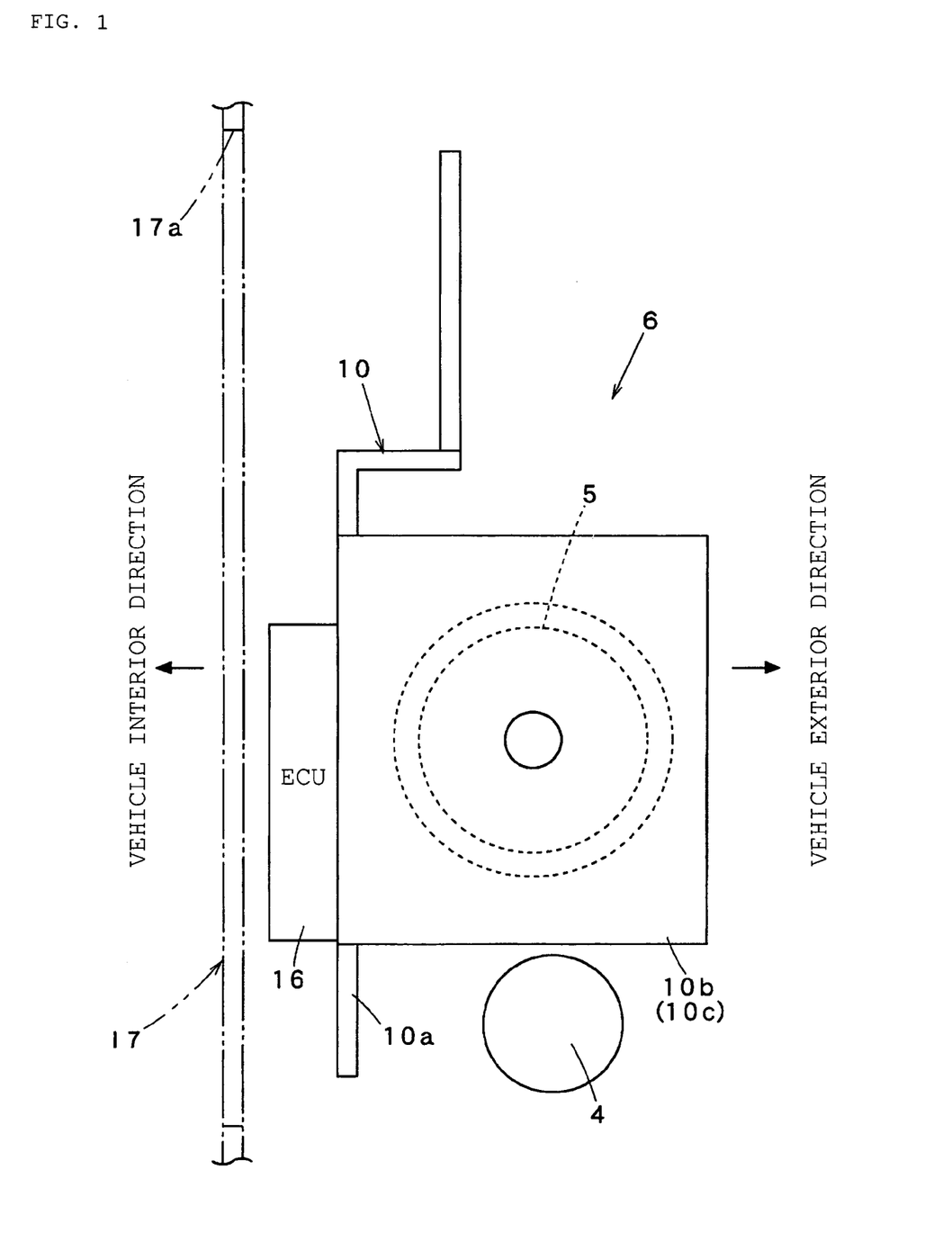
FIG. 1 is a schematic view illustrating a seat belt retractor according to an exemplary embodiment.

FIG. 1 is a schematic view illustrating an exemplary embodiment of a seat belt retractor. In the explanations for the respective exemplary embodiments below, the same reference numerals refer to the similar components of the previously described exemplary embodiments and a detailed explanation for the components will be omitted.

As illustrated in FIG. 1, a seat belt retractor 6 is supported by the frame 10 to allow for rotation and includes a C-shaped frame 10 and a spool 5 for winding a seat belt 3. The seat belt retractor 6 includes an electric motor 4 for rotating the spool 5 in a seat belt retracting direction and a seat belt withdrawing direction. The seat belt retractor 6 also includes a generally flat plate-shaped electronic control unit (ECU) 16 for driving and controlling the motor 4. The seat belt retractor 6 is configured to both retract and withdraw the seat belt 3 by a driving force of the motor 4.

The motor 4 is disposed at the same side as that of the spool 5 in relation to a back plate 10a below both of side walls 10b and 10c of the frame 10 (since the side wall 10c is visually overlapped with the side wall 10b, the reference numeral is shown in brackets). The motor 4 is detachably fixed to at least one of the back plate 10a and side walls 10b and 10c of the frame 10 such that a longitudinal direction of the motor 4 (e.g., an axial direction of a rotation shaft of the motor 4) is in parallel with an axial direction of the spool 5.

The ECU 16 is attached to the seat belt retractor 6 on a surface of the back plate 10a at a side facing away from the spool 5. The ECU 16 is detachably attached to a position of a lower part of the back plate 10a facing side walls 10b and 10c and situated near the motor 4. A length of wiring for an electric connection between the ECU 16 and the motor 4 may be shortened and thus the electric connection may be formed more easily. Other constructions of the seat belt retractor 6 of may be substantially to those of the exemplary embodiment illustrated in FIG. 6.

The seat belt retractor 6 is disposed at, for example, an inner space of a center pillar 17 (e.g., at a side of a vehicle exterior direction of the center pillar 17) such that a surface of the back plate 10a facing away from the spool 5 faces a vehicle interior direction, as illustrated in FIG. 1.

At least some parts of the seat belt retractor 6 to which the ECU 16 is attached are covered with the center pillar 17. The ECU 16 is configured to face the vehicle exterior direction where the seat belt retractor 6 is assembled with the vehicle body. The ECU 16 is configured to face an opening 17a of the center pillar 17 for inserting and removing the seat belt retractor 6.

Because the ECU 16 is attached to the back plate 10a while facing the vehicle interior direction, the ECU 16 can be detached and exchanged for another ECU 16 through the opening 17a without detaching an entire seat belt retractor 6 (e.g., when the ECU 16 broken down). Thus, the ECU 16 can be more easily removed or installed even when the ECU 16 is attached to the seat belt retractor 6.

Because the ECU 16 is attached to a surface of the back plate 10a at a position facing side walls 10b and 10c, the ECU 16 (or a housing of the ECU 16) can be used as a reinforcing member for the frame 10 while being encased by side walls 10b and 10c. Therefore, the strength of the frame 10 can be increased without increasing the wall thickness, complexity, or size of the frame 10. Even when the ECU 16 is attached to the seat belt retractor 6, the seat belt retractor 6 can be generally lightweight and compact and assembling the seat belt retractor 6 into a limited narrow space inside the motor vehicle (e.g., an inner space of the center pillar 17) can be easier.

Vibration of the seat belt retractor 6 can be suppressed because the ECU 16 is attached to the back plate 10a at a position facing side walls 10b and 10c and acts as a counter weight. Other operations and advantages of the seat belt retractor 6 may be substantially similar to conventional known seat belt retractors where the spool is driven by a motor.

Figure 2:
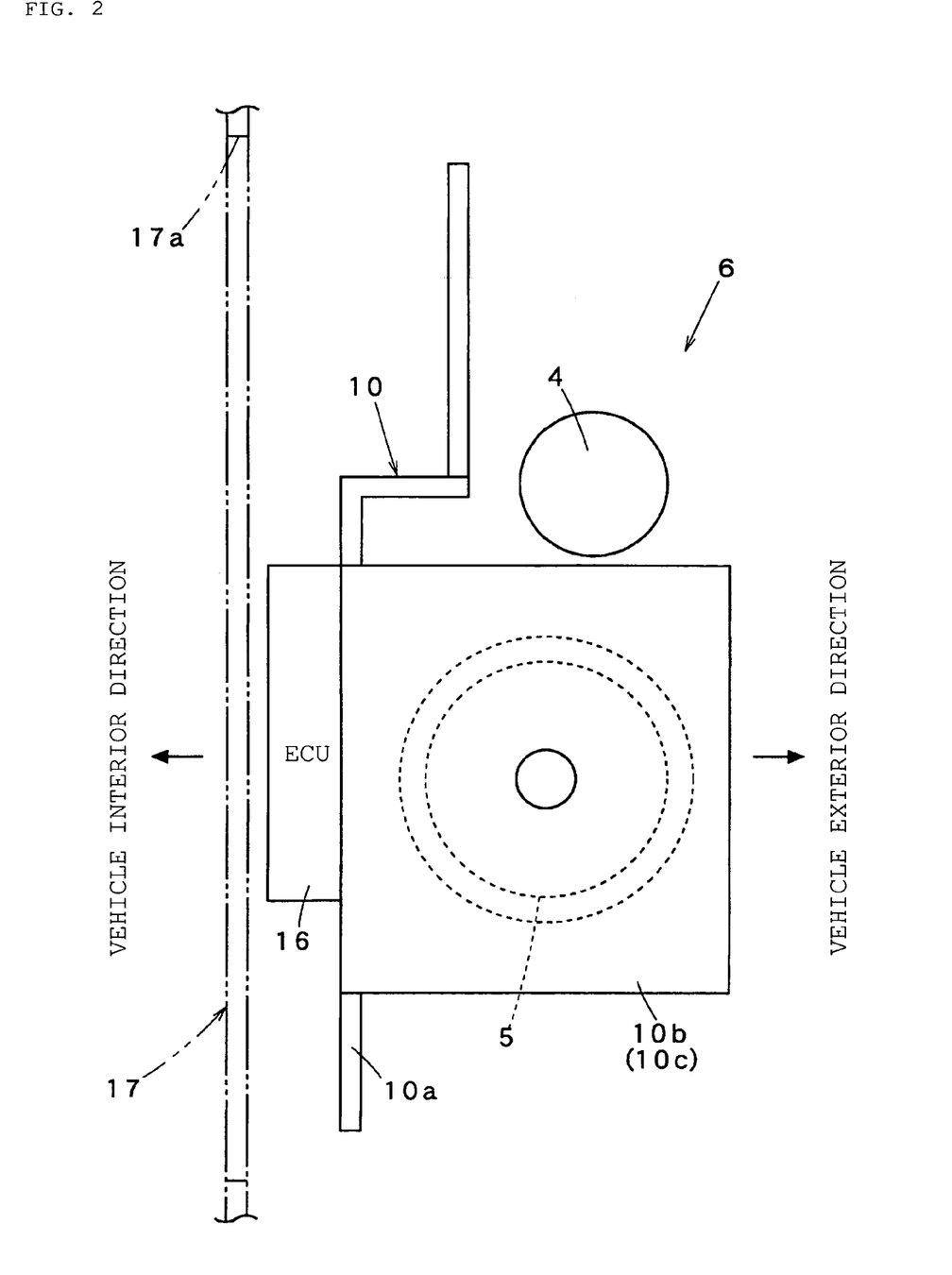
FIG. 2 is a schematic view illustrating a seat belt retractor according to another exemplary embodiment.

FIG. 2 is a schematic view illustrating another exemplary embodiment of the seat belt retractor. Although the motor 4 is disposed below side walls 10b and 10c in the exemplary embodiment of FIG. 1, according to other exemplary embodiments the motor 4 may be disposed above side walls 10b and 10c in the seat belt retractor 6. The motor 4 is fixed to at least one of the back plate 10a, the side wall 10b, and the side wall 10c. Because the motor 4 is disposed at an upper part of both side walls 10b and 10c, the ECU 16 is detachably attached to a position near motor 4 of an upper part of the back plate 10a facing side walls 10b and 10c. Other constructions, operations, and advantages of the seat belt retractor 6 may be similar to those of the exemplary embodiment of FIG. 1.

Figure 3:
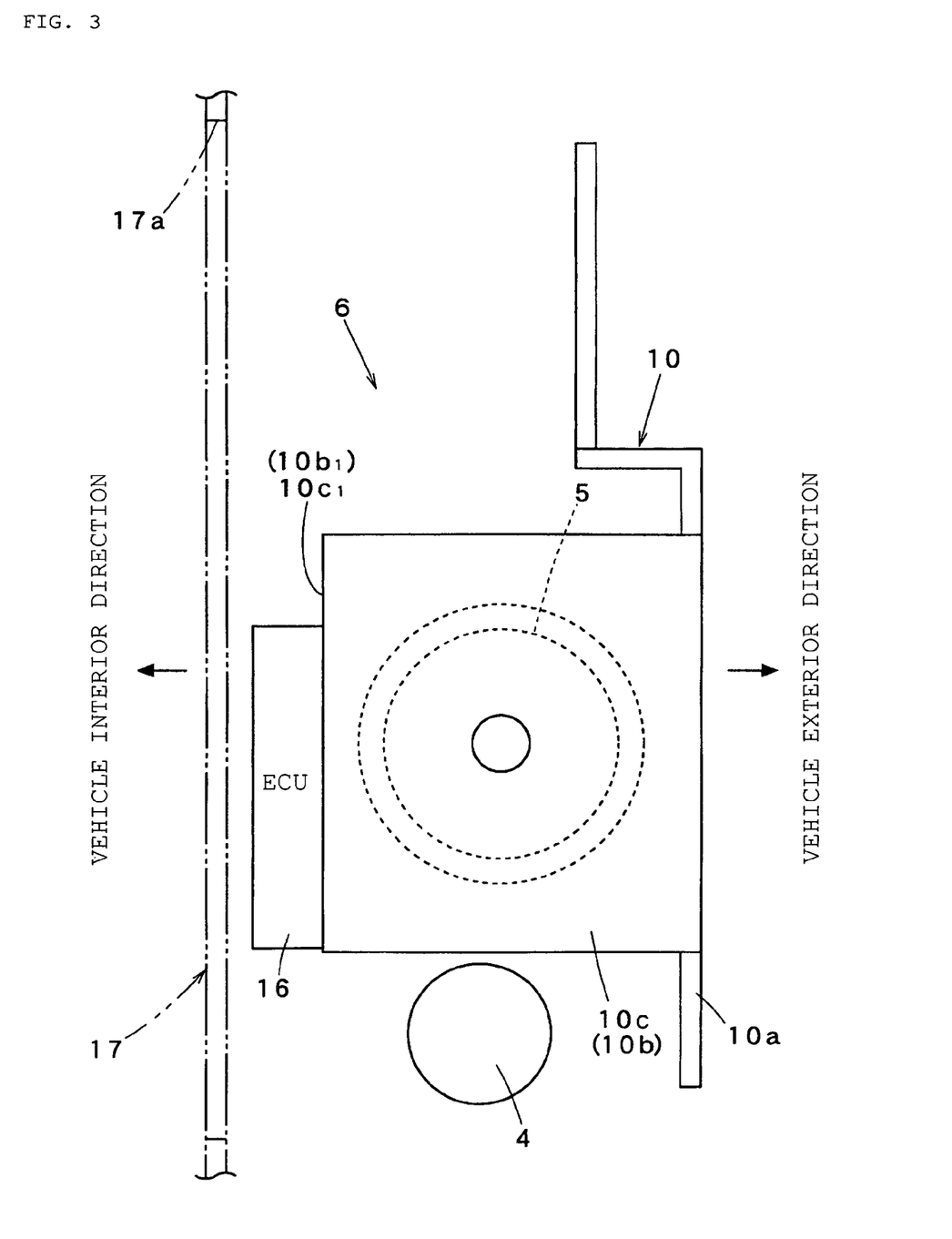
FIG. 3 is a schematic view illustrating a seat belt retractor according to another exemplary embodiment.

FIG. 3 is a schematic view illustrating a another exemplary embodiment of the seat belt retractor. Although the seat belt retractor 6 is attached to the vehicle body so the surface of the back plate 10a facing away from the spool 5 faces the vehicle interior direction and the ECU 16 is attached to the surface of the back plate 10a facing the vehicle interior direction in the exemplary embodiment of FIG. 1, according to other exemplary embodiments the seat belt retractor 6 may be attached such that end surfaces 10b1 and 10c1 facing away from the back plate 10a of side walls 10b and 10c faces the vehicle interior direction. The ECU 16 is attached on the end surfaces 10b1 and 10c1 of the side walls 10b and 10c and faces the opening 17a of the center pillar 17. Other constructions, operations, and advantages of the seat belt retractor 6 may be similar to those of the exemplary embodiment of FIG. 1.

Figure 4:
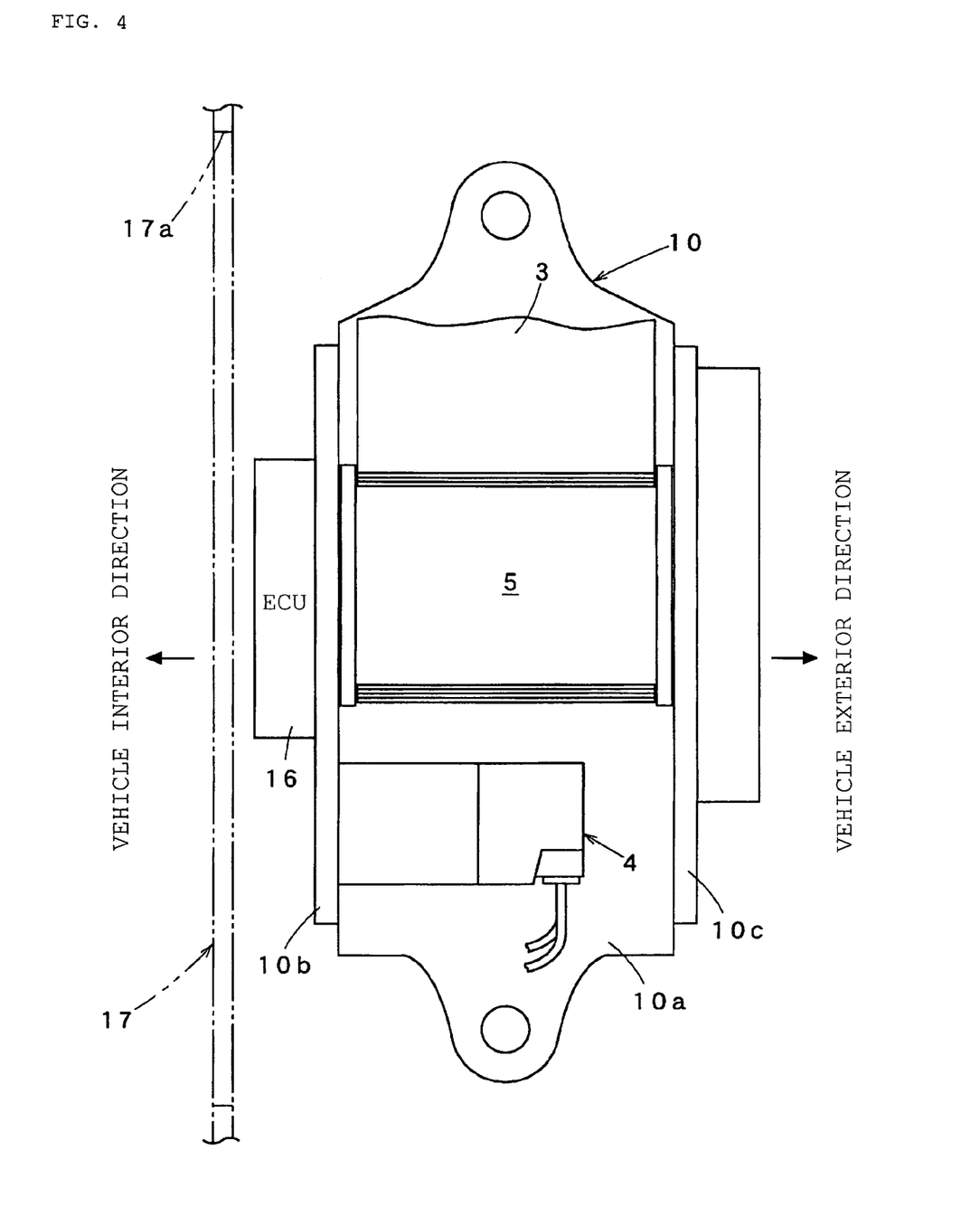
FIG. 4 is a schematic view illustrating a seat belt retractor according to another exemplary embodiment.

FIG. 4 is a schematic view illustrating another exemplary embodiment of the seat belt retractor. Although the seat belt retractor 6 is attached to the vehicle body so the surface of the back plate 10a facing away from the spool 5 faces the vehicle interior direction in the exemplary embodiment of FIG. 1, according to other exemplary embodiments the ECU 16 may be attached to the surface of the back plate 10a facing the vehicle interior direction. The seat belt retractor 6 is attached such that the side wall 10b faces the vehicle interior direction as illustrated in FIG. 4. The ECU 16 is attached to the side wall 10b and faces the opening 17a of the center pillar 17 in the seat belt retractor 6. Other constructions, operations, and advantages of the seat belt retractor 6 may be similar to those of the exemplary embodiment of FIG. 1.

The seat belt retractor of the present disclosure is not limited to the described exemplary embodiments and the seat belt retractor can be configured to perform only the retracting operation for the seat belt with a driving force of the motor or can be configured to perform only the withdrawing operation for the seat belt by the driving force of the motor. The seat belt retractor of the present disclosure is configured to perform at least one of the retracting and withdrawing operations for the seat belt.

The seat belt retractors of the exemplary embodiments illustrated in FIGS. 1 and 2 can be used as the seat belt retractor in the three-point type seat belt apparatus 1 illustrated in FIG. 5. If the seat belt apparatus 1 includes the seat belt retractor 6 of FIGS. 1-4 and because the seat belt retractor 6 is generally compact and capable of being assembled in a narrow space such as the inner space of the center pillar 17, an inner space of a vehicle interior of a motor vehicle may not be wastefully occupied by the seat belt retractor 6 even when it includes the motor 4 and the ECU 16. Therefore, the restraint of an occupant may be adjusted by a belt tension control for the seat belt 3 by the motor 4 without reducing comfort of the occupant.

The seat belt retractor and the seat belt apparatus can be used to perform at least one of retracting and withdrawing operations for the seat belt by controlling rotation of a spool with a motor.

The priority application, Japanese Patent Application No. 2007-217302, filed Aug. 23, 2007 including the specification, drawings, claims and abstract, is incorporated herein by reference in its entirety.

It is important to note that the arrangements of the seat belt retractor, as shown, are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited herein. Many modifications are possible without departing from the scope of the invention unless specifically recited in the claims. Accordingly, all such modifications are intended to be included within the scope of the present disclosure as described herein. The order or sequence of any process or method steps may be varied or re-sequenced according to alternative embodiments. Other substitutions, modifications, changes, and/or omissions may be made in the design, operating conditions and arrangement of the preferred and other exemplary embodiments without departing from the exemplary embodiments of the present disclosure as expressed herein.

What is claimed is:

1. A seat belt retractor comprising:
a frame, the frame comprising a back plate and a side wall protruding from each of a plurality of side edges of the back plate;
a spool supported by the frame and rotating to wind a seat belt;
a motor for rotating the spool; and
an electronic control unit for controlling the drive to the motor,
wherein the electronic control unit is attached to a surface of the frame in a direction of a vehicle interior, and
wherein a surface of the back plate facing away from the spool faces the direction of the vehicle interior and the electronic control unit is on the surface of the back plate facing away from the spool.

2. The seat belt retractor according to claim 1, wherein the electronic control unit is attached to a surface of the back plate facing the direction of the vehicle interior at a position facing multiple side walls of the frame.

3. A seat belt retractor comprising:
a frame, the frame comprising a back plate and a side wall protruding from each of a plurality of side edges of the back plate;
a spool supported by the frame and rotating to wind a seat belt;
a motor for rotating the spool; and
an electronic control unit for controlling the drive to the motor,
wherein the electronic control unit is attached to a surface of the frame in a direction of a vehicle interior, and
wherein an end surface of multiple side walls of the frame at a side of the frame opposite to the back plate faces the direction of the vehicle interior and the electronic control unit is installed on the end surface of multiple side walls.

4. A seat belt apparatus comprising:

a seat belt retractor including a frame having a back plate and a side wall protruding from each of a plurality of side edges of the back plate;

wherein the retractor further includes a spool supported by the frame and rotating to wind a seat belt, a motor for rotating the spool in order to perform at least one of retracting and withdrawing a seat belt, and an electronic control unit for controlling the drive to the motor; wherein the electronic control unit is attached to a surface of the frame in a direction of a vehicle interior;

a tongue slidably supported by the seat belt and withdrawn from the seat belt retractor; and a buckle for engaging and disengaging the tongue and restraining an occupant with the seat belt by engaging the tongue with the buckle, wherein a surface of the back plate facing away from the spool faces the direction of the vehicle interior and the electronic control unit is on the surface of the back plate facing away from the spool.

5. The seat belt apparatus according to claim 4, wherein the electronic control unit is attached to a surface of the back plate facing the direction of the vehicle interior at a position facing multiple side walls of the frame.

6. A seat belt retractor comprising:

a seat belt retractor including a frame having a back plate and a side wall protruding from each of a plurality of side edges of the back plate;

wherein the retractor further includes a spool supported by the frame and rotating to wind a seat belt, a motor for rotating the spool in order to perform at least one of retracting and withdrawing a seat belt, and an electronic control unit for controlling the drive to the motor; wherein the electronic control unit is attached to a surface of the frame in a direction of a vehicle interior;

a tongue slidably supported by the seat belt and withdrawn from the seat belt retractor; and a buckle for engaging and disengaging the tongue and restraining an occupant with the seat belt by engaging the tongue with the buckle, wherein an end surface of multiple side walls of the frame at a side of the frame opposite to the back plate faces the direction of the vehicle interior and the electronic control unit is installed on the end surface of multiple side walls.

* * * * *